US011447224B2

(12) United States Patent
Zhou

(10) Patent No.: US 11,447,224 B2
(45) Date of Patent: Sep. 20, 2022

(54) DRIVING ZONE CONTROL FOR PERSONAL WATERCRAFT

(71) Applicant: Wesley Zhou, Aliso Viejo, CA (US)

(72) Inventor: Wesley Zhou, Aliso Viejo, CA (US)

( * ) Notice: Subject to any disclaimer, the term of this patent is extended or adjusted under 35 U.S.C. 154(b) by 587 days.

(21) Appl. No.: 16/568,760

(22) Filed: Sep. 12, 2019

(65) Prior Publication Data

US 2021/0078689 A1   Mar. 18, 2021

(51) Int. Cl.
| | |
|---|---|
| *B60L 15/20* | (2006.01) |
| *B63H 25/04* | (2006.01) |
| *H04W 4/021* | (2018.01) |
| *H04W 4/80* | (2018.01) |
| *F21V 8/00* | (2006.01) |
| *B63J 99/00* | (2009.01) |
| *B63B 79/00* | (2020.01) |

(52) U.S. Cl.
CPC .............. *B63H 25/04* (2013.01); *B60L 15/20* (2013.01); *B63J 99/00* (2013.01); *G02B 6/0073* (2013.01); *H04W 4/021* (2013.01); *H04W 4/80* (2018.02); *B60L 2200/32* (2013.01); *B63B 79/00* (2020.01); *B63H 2025/045* (2013.01)

(58) Field of Classification Search
CPC ........ B60L 15/20; B60L 2200/32; B63B 9/40; B63B 49/00; B63B 34/10; H04W 4/80; H04W 4/021; B63J 99/00; G02B 6/0073; B63H 25/04; B63H 2025/045; Y02T 10/72
See application file for complete search history.

(56) References Cited

U.S. PATENT DOCUMENTS

| | | | | |
|---|---|---|---|---|
| 11,118,936 | B1* | 9/2021 | Wang | G01C 23/005 |
| 2016/0125739 | A1* | 5/2016 | Stewart | B63B 43/18 |
| | | | | 701/301 |
| 2017/0227639 | A1* | 8/2017 | Stokes | G01S 15/104 |
| 2020/0050893 | A1* | 2/2020 | Suresh | G06N 3/0454 |
| 2020/0057488 | A1* | 2/2020 | Johnson | G06T 19/20 |
| 2020/0201359 | A1* | 6/2020 | Burghardt | G01C 23/005 |
| 2021/0166568 | A1* | 6/2021 | Kersulec | G05D 1/0206 |
| 2021/0206460 | A1* | 7/2021 | Hawker | B63B 79/40 |
| 2021/0261226 | A1* | 8/2021 | Johnson | B63B 79/15 |
| 2021/0269128 | A1* | 9/2021 | Rivers | B63B 79/40 |

(Continued)

OTHER PUBLICATIONS

Pyrchla et al., Hydrographic Multisensory Unmanned Watercraft, 2018, IEEE, p. 231-235 (Year: 2018).*

(Continued)

*Primary Examiner* — McDieunel Marc
(74) *Attorney, Agent, or Firm* — Lapple Ubell IP Law, LLP; Franklin D. Ubell

(57) ABSTRACT

The position of a watercraft is detected by monitoring GPS position data, and the speed of the watercraft is reduced to a selected limit upon detecting that the watercraft has traveled outside of a selected boundary and is maintained until it is detected that the watercraft has been back within the boundary for a selected time interval, thereby avoiding up and down jerking motion of the watercraft which can occur when only a single location test is used to confirm that the watercraft is back in bounds. An RF transceiver and related control apparatus is employed for detecting other watercraft approaching too closely to the watercraft, and a display is provided for displaying various status and warning indications.

18 Claims, 7 Drawing Sheets

(56) References Cited

U.S. PATENT DOCUMENTS

2021/0291948 A1* 9/2021 Yamamoto ............. B63H 20/10
2022/0043112 A1* 2/2022 Stokes ...................... G01S 7/10

OTHER PUBLICATIONS

Grewal et al., Applications to Navigation, 2015, IEEE, p. 503-592 (Year: 2015).*
Gatti et al., Boat Navigation and Safeguard of Passenger's Over Flood Disaster, 2018, IEEE, p. 2274-2277 (Year: 2018).*
Woelfel et al., Development of an autonomous planning watercraft test bed, 2004, IEEE, p. 285-289 (Year: 2004).*
Track Your Watercraft, pages from https://www.ototrak.com, Nov. 15, 2018, 16 pages.
What is Geofencing and How Does it Work, pages from https://www.techtricksworld.com, Jul. 26, 2019, 4 pages.
How does geofencing work (from a developer standpoint)?, pages from https://www.quora.com, Jul. 26, 2019, 3 pages.
The future of Georencing, pages from https://www.spyzie.com, Jul. 26, 2019, 1 page.
The GPS and jet ski control, pages from https://garitransfer.com, Jul. 26, 2019, 2 pages.
Geo-Fence, pages from https://en.wikipedia.org, Jul. 26, 2019, 3 pages.
Inclusion of a Point in a Polygon, pages from https://geomalgorithms.com, Aug. 19, 2019, 7 pages.

* cited by examiner

DRIVING ZONE CONTROL FOR PERSONAL WATERCRAFT

BACKGROUND

Field

The subject disclosure relates to methods and apparatus for controlling boundaries within which personal watercraft or other objects of interest may be confined to operate, and more particularly to such methods and apparatus employing GPS position data.

Description of Related Art

Personal watercraft are sometimes rented by businesses who desire to limit the area in which the watercraft may be used for safety or other reasons.

SUMMARY

According to an illustrative embodiment, a method of driving zone control for a personal watercraft (PWC) is provided comprising establishing a first perimeter or boundary of permitted travel by storing GPS position data as the watercraft is driven through a selected path during a first operation of the watercraft. During a subsequent operation of the watercraft, the position of the watercraft is detected by monitoring GPS position data, and the speed of the watercraft is reduced to a selected limit upon detecting that the watercraft has traveled beyond the first perimeter. In one illustrative embodiment, the limitation on the speed of the watercraft is maintained until it is detected that the PWC has been back within the boundary for a selected time interval. This determination avoids a phenomenon which can occur wherein employing only a single position test to confirm that the PWC is back in bounds can cause the PWC to experience an unpleasant up-down-up-down jerking change of speed as the operator attempts to drive the watercraft back inside the permitted zone of travel, while not knowing where the boundary of that zone actually is.

Apparatus for implementing the illustrative method is also provided and may include an RF transceiver and related control apparatus for detecting other watercraft approaching too closely to the PWC and taking responsive action, as well as a display for displaying various status and warning indications.

Apparatus is further provided comprising a display allowing a rider to monitor the operational status of the watercraft. In one embodiment, the display comprises a panel containing a plurality of lighting devices, the lighting devices including a timer lighting device of a first color, an out of zone lighting device of a second color, a warning light of a third color, and a GPS light of a selected color. In one illustrative embodiment such apparatus may further comprise a programmed processor operative to activate the lighting devices, for example, to activate the timer light when operation of the watercraft begins and to cause it to flash continuously during a selected time interval before operation of the watercraft is to conclude, to activate the selected color light to indicate that the GPS receiver is operational to provide data to the programmed processor, to flash the out of zone light on and off during a boundary marking operation, and to light up the out of zone light after a boundary has been marked to indicate that the watercraft has traveled outside the boundary perimeter.

DETAILED DESCRIPTION OF ILLUSTRATIVE EMBODIMENTS

Figure 1:
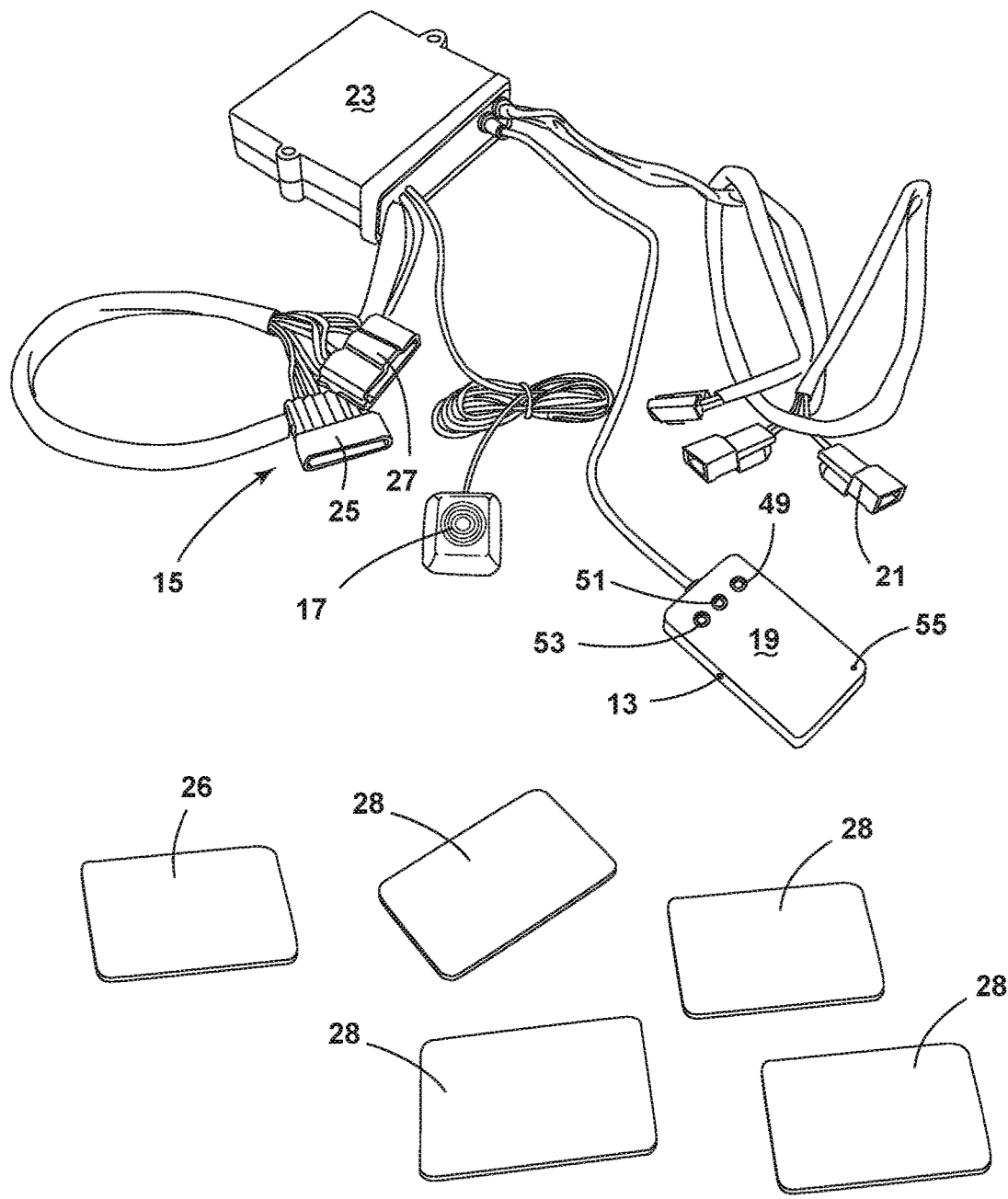
FIG. 1 is top perspective view of watercraft control apparatus according to an illustrative embodiment.

FIG. 1 illustrates apparatus for, among other things, implementing driving zone or boundary establishment and control for a personal watercraft, for example, such as a jet ski.

The apparatus of FIG. 1 includes an alert unit 13, throttle override apparatus 15, a GPS receiver 17, a time/location card reader 19, power connectors 21 and a controller unit 23. In one embodiment, the alert unit 13 may produce an audible alarm, which may be, for example, a buzzing noise.

Respective electrical cables interconnect each of the components 15, 17, 19, 21 to the control unit 23. The apparatus further includes one or more set zone cards 26 and one or more timer cards 28. In one embodiment, set zone cards 26 and timer cards 28 include RFID chips and the time/location reader 19 may comprise an RFID scanner configured to read data off the RFID chips and supply it to the controller unit 23. In one illustrative embodiment, the card reader 19 may further include LEDs or other lighting devices 49, 51, 53, 55.

In one embodiment, the throttle override apparatus 15 comprises male and female and electrical connectors 25, 27, which are respectively configured to plug into and electrically connect with respective existing female and male throttle control connectors of a personal watercraft to thereby interpose a control function on the speed of the watercraft implemented by the controller unit 23. The GPS receiver 17 may be a conventional commercially available unit configured to receive GPS positional coordinate information from satellites via a self-contained antenna. The time/location key reader 19 may also be a conventional commercially available component. The power connectors 21 may also be commercially available electrical connectors selected to connect with power connectors already in place in the personal watercraft to supply, for example, 12 volts D.C. to the controller unit 23.

Figure 2:
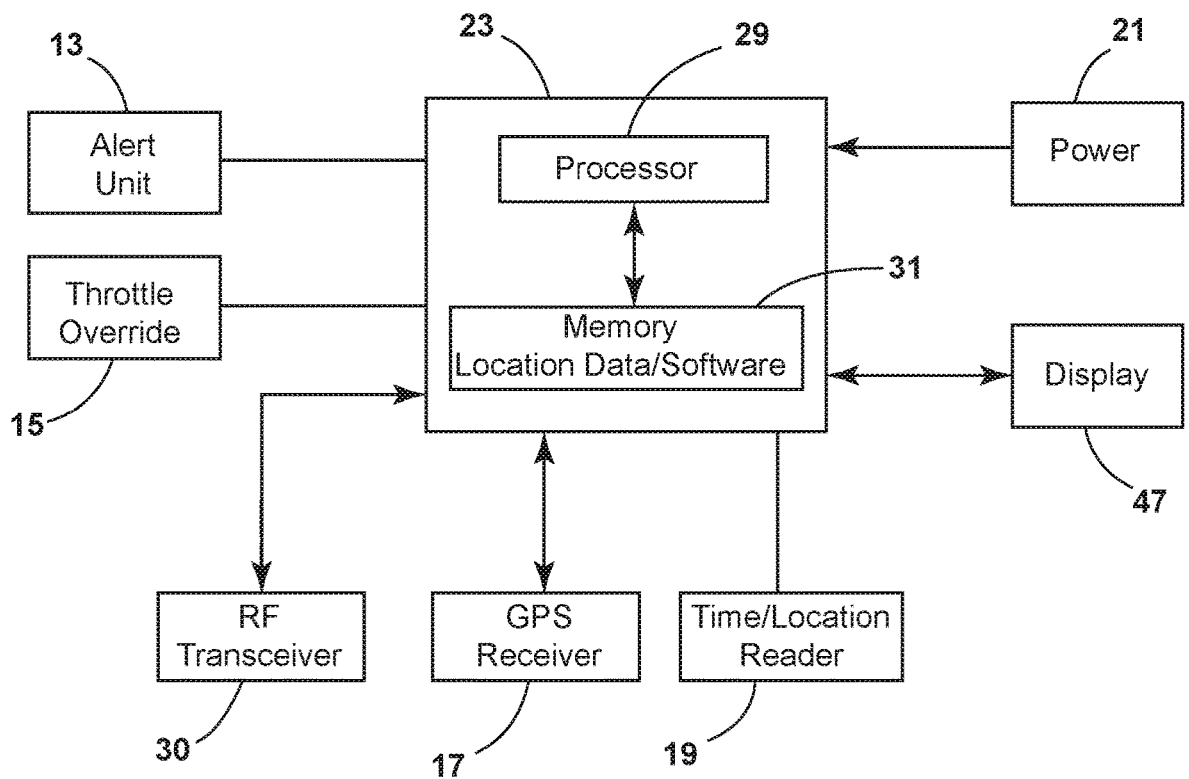
FIG. 2 is a schematic block diagram of watercraft control apparatus according to an illustrative embodiment.

As shown in FIG. 2, the controller unit 23 includes a programmed computing device or computer 29 such as, for example, at least one or more than one processor, microprocessor, or microcontroller for executing instructions stored in a memory 31 to respond to inputs from and control the operation of the interconnected components 15, 17, 19, 30, 47, as hereafter described in more detail. In other embodiments, the controller unit 23 or portions of the functionality thereof may be implemented in hardwired logic or in other manners to achieve the desired operation and functionality. Prior to operation, the controller unit 23 and attached components 15, 17, 21 are installed at appropriate locations within the interior of the personal watercraft.

In an illustrative embodiment, the memory 31 comprises a computer readable medium or computer readable media. For the purposes of this disclosure, a computer readable medium stores computer data, which data can include computer program code that is executable by a computer in machine readable form. By way of example, and not limitation, a computer readable medium may comprise computer readable storage medium or media for tangible or fixed storage of data. Computer readable storage medium or media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor. In certain embodiments, when suitable computer program code is loaded into and executed by a computer, the computer becomes a specially configured apparatus.

The apparatus of FIG. 2 further includes an RF Transceiver 30 set up to communicate with RF Transceivers of nearby personal watercraft. The RF Transceiver 30 may be a relatively low power unit communicating using a wireless protocol. In an illustrative embodiment, the wireless protocol is the IEEE 802.15.4 protocol, but could be other protocols in other embodiments, for example, such as Blue Tooth or IEEE 802.11. In one embodiment, the RF Transceiver 30 is mounted within the housing of the controller 23.

Figure 3:
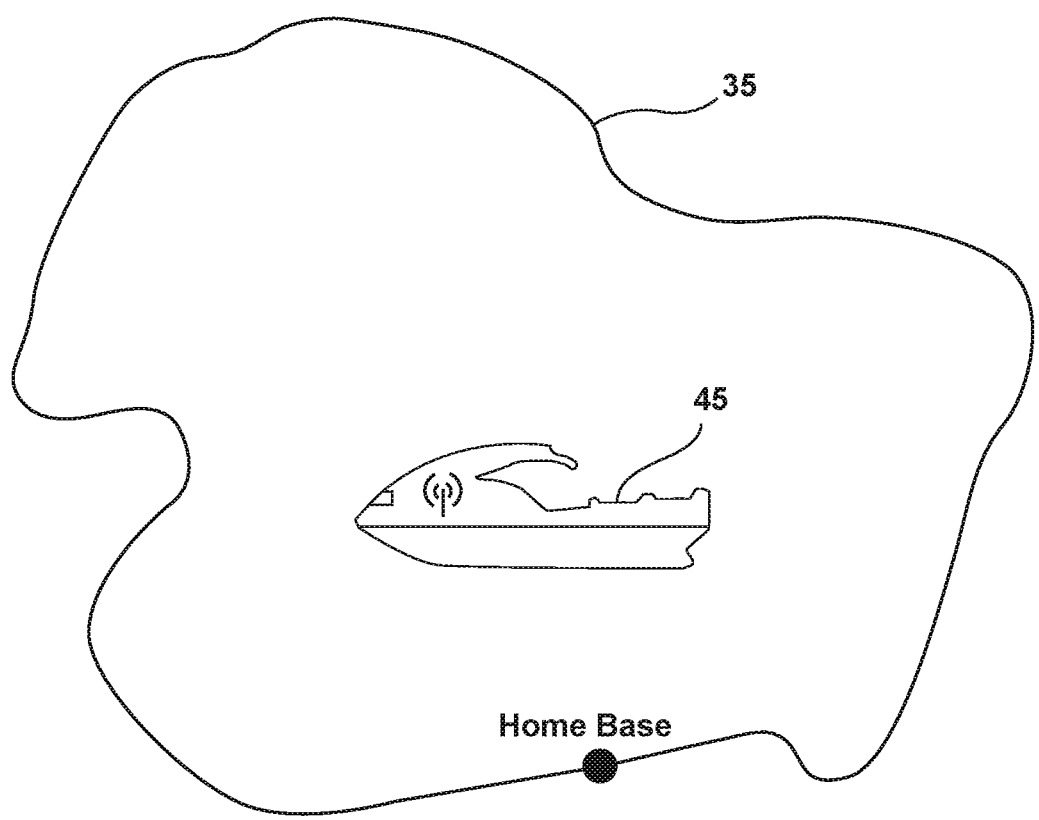
FIG. 3 is a schematic diagram illustrating a perimeter limit of travel for a watercraft according to an illustrative embodiment.

In an illustrative embodiment, a boundary 35 for limiting travel of a personal watercraft 45 is established by scanning a set zone card 26 and riding the watercraft 45 around an area to establish a perimeter, such as perimeter 35 shown in FIG. 3. The perimeter 35 may be of any arbitrary shape, depending upon where the watercraft 45 is driven. In an illustrative embodiment, as the watercraft 45 traverses the path of perimeter 35, the GPS location data from the GPS receiver 17 is sampled by the processor 29 and stored in the memory 31, such that a representation of the perimeter 35 or "set zone area" is stored in memory. In an alternate embodiment, a boundary perimeter may be pre-programmed into the memory 31, for example by an owner of the PWC 45 who is renting it out to a series of users.

During a subsequent operation of the watercraft, the processor 29 compares the position of the watercraft established by the GPS data to detect whether the position of the watercraft 45 has moved to a point outside of the established boundary perimeter or set zone area 35. If so, the processor 29 provides a throttle control signal via the throttle control override connectors 25, 27 which reduces and limits the watercraft speed to a selected slow level, such as, for example, 5 mile per hour, thereby signaling to the watercraft operator that the watercraft 45 is beyond the permitted area of operation and effectively rendering the watercraft 45 unsuitable for normal operation. Once the watercraft returns to a position within the perimeter 35, the GPS data provided to the processor 29 causes the processor 29 to detect that position and withdraw the restriction on the speed of the watercraft 45.

Figure 4:
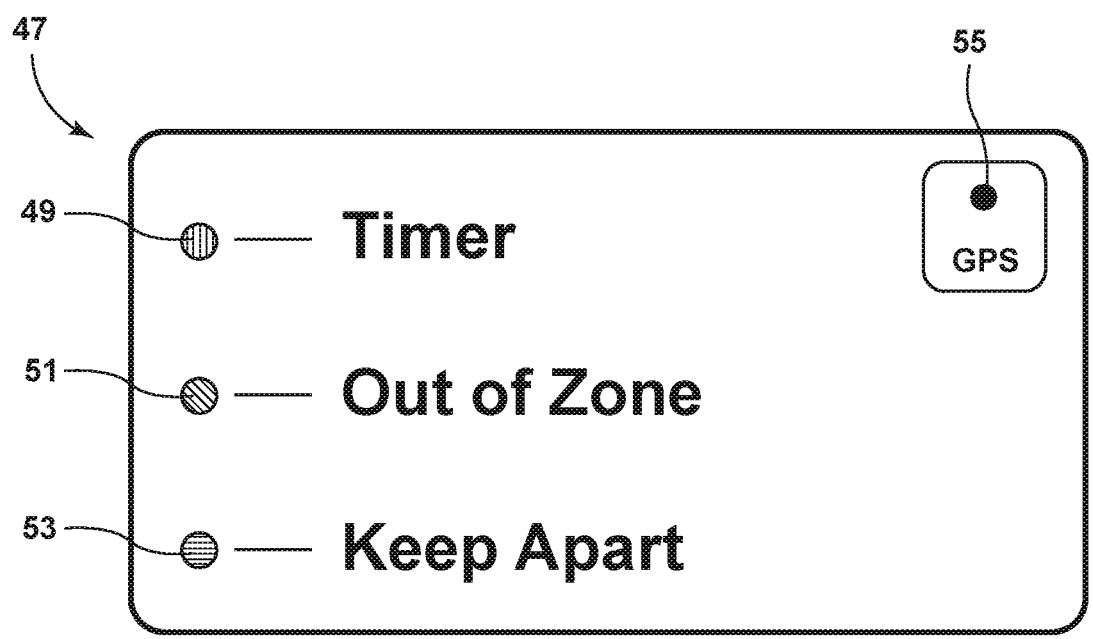
FIG. 4 is a schematic diagram illustrating a display according to an illustrative embodiment.

The illustrative embodiment of FIG. 2 further includes a display 47 as shown in FIG. 4. This display 47 includes a green "Timer" LED 49, an orange "Out of Zone" Led 51, a red "Keep Apart" LED 53, and a small green "GPS" LED 55 in the upper right corner. In the embodiment of FIG. 4, the three LEDs 49, 51, 53 and their labels are arranged in a vertical column. However, they could be arranged differently and have different colors in different embodiments. In the embodiment of FIG. 1, the display 47 is incorporated in the card reader unit 19, which may be attached to a suitable portion of the PWC 45, for example, on the handlebars or instrument console, by suitable fasteners such as a Velcro fastener or fixed fasteners such as screws.

In operation of one embodiment, and as discussed further below, the Timer LED 49 turns on when time is started and begins to flash continuously during the last three minutes of operation to alert the operator that ride time is about to be up. The orange LED 51 is lit when the PWC 45 travels out of zone and turns off when it returns back into zone. The red LED 53 is illuminated when the PWC 45 comes too close to another watercraft. The small white LED 55 turns on to indicate that the GPS unit 17 is operational to provide GPS data. When the LED 55 is on and the PWC 45 is operated to establish the boundary of operation or "set zone area", the orange LED 51 will flash all through the boundary marking operation. To signal successful establishment of the boundary, the orange LED 51 goes off and the large green LED 49 then goes on for two seconds. In one embodiment, an unsuccessful attempt to establish the boundary may be indicated by flashing the red LED 53 five times. In one embodiment, the display 47 is hardwired to the controller 23 and illumination of the LEDs is controlled by the processor 29.

Figure 5:
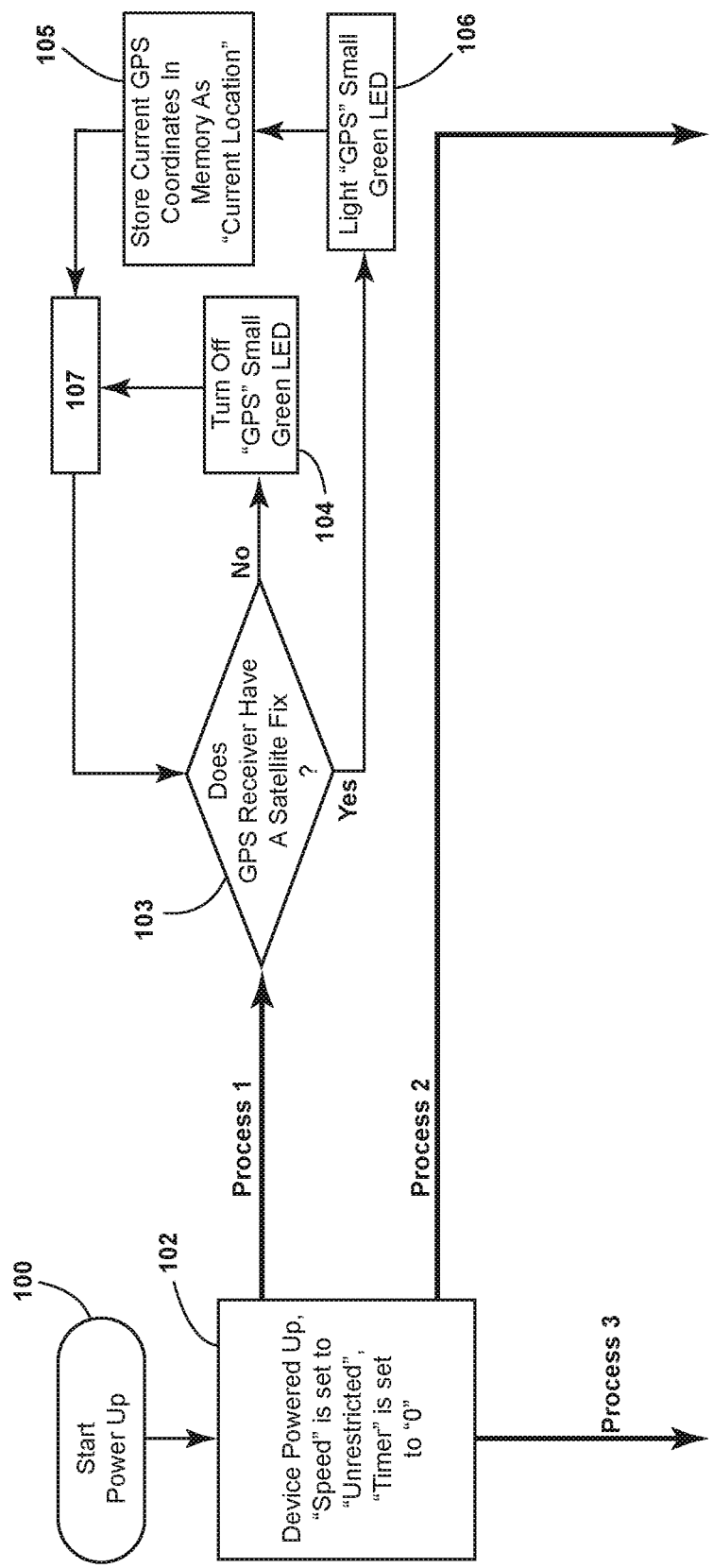
FIGS. 5-7 are flow diagrams useful in illustrating the operation of the watercraft control apparatus.
Figure 6:
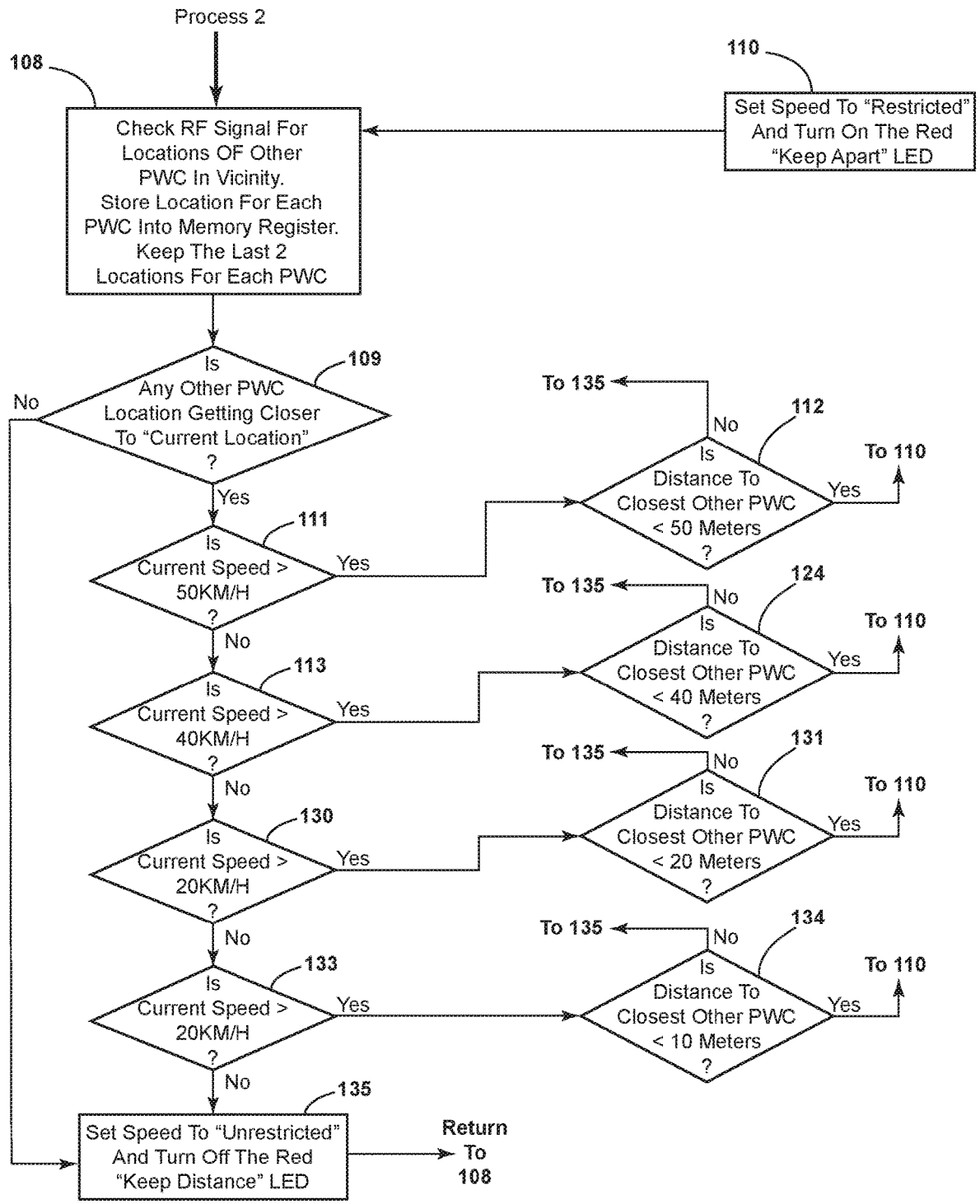
Figure 7:
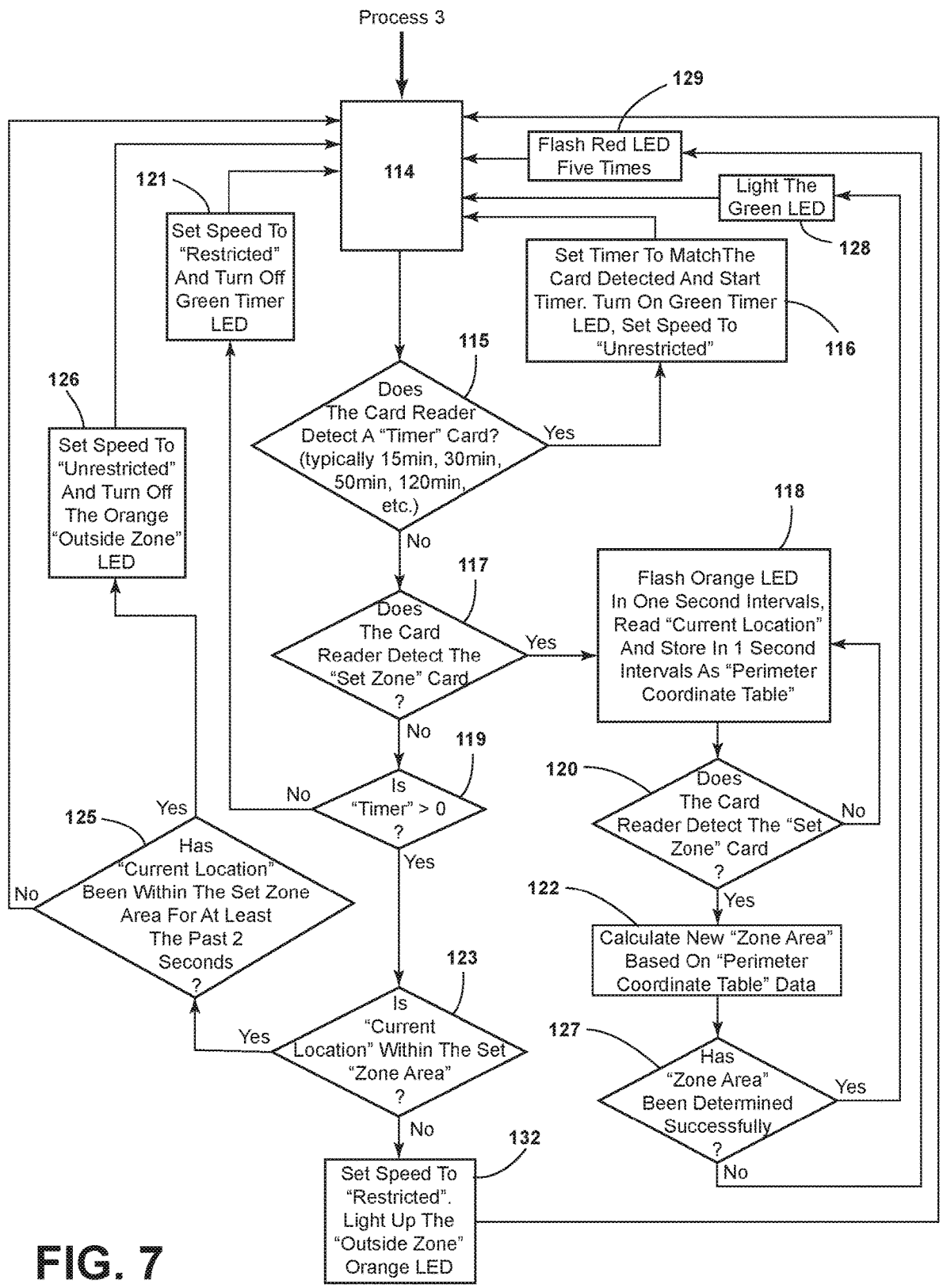

Illustrative processes for execution by the controller 23 are shown in FIGS. 5-7. In step 100, the device is powered up. The speed limit of the PWC 45 is then set to unrestricted and a timer is set to zero in step 102. In Process 1 shown in FIG. 5, the controller 23 checks in step 103 to see if the GPS receiver 17 has a satellite fix. If so, the flow proceeds to step 106, where the green GPS LED 55 is lit up and then to step 105 where the current GPS coordinates of the PWC 45 are stored in memory as "current location." If a satellite fix has not been achieved, the green LED 55 may be turned off in step 104, after which step 103 to check for a satellite fix is repeated.

A second Process 2 is illustrated in FIG. 6, which is designed to avoid collisions with other nearby PWCs. In an illustrative embodiment, the nearby PWCs are also equipped with watercraft control apparatus as described herein in connection with FIGS. 1-7.

In an illustrative embodiment, the RF signal from Transceivers 30 only has a limited range, which is such that the Process assumes that PWCs outside of RF range are not going to be a collision danger. What is broadcast by RF continuously is the current location of each PWC, which, in one embodiment may be updated in 200 ms intervals. Thus, as soon as a Transceiver 30 receives an RF signal, the controller 23 will wait for a few location updates and then will determine whether the distance to this other or "second" PWC is increasing or decreasing. In one embodiment, for the unit to set speed to "restricted" in order to avoid collision threats, three requirements must be met:

1) the distance to the other PWC is close enough to be a potential danger: this is determined simply detecting that an RF signal has been received from the other PWC,
2) the distance to the other PWC must be decreasing, and
3) the distance to the other PWC is less than a "safe distance", which is related to speed, as discussed further below.

In an illustrative embodiment, unless these three criteria are met, the PWC 45 stays in "unrestricted" mode. In one embodiment, the unit behaves the same with multiple other PWCs in the vicinity.

According to the flow diagram of FIG. 6, in step 108 of Process 2, the RF signal from Transceiver 30 is checked to locate other PWC's in the vicinity, and the location of each such PWC is stored in a memory register. If, in step 109, another PWC is determined to be getting closer to the current location, the flow proceeds to a series of tests 111, 113, 130, 133 where the current speed of the PWC 45 is checked. Based upon the current speed, one of a series of second tests 112, 124, 131, 134 is applied where the controller 23 causes the speed of the PWC 45 to be set to "restricted," and the red "keep distance" LED is turned on if the closest other approaching PWC is within a selected distance of the PWC 45. The rider/driver of the PWC 45 can then take action to avoid danger, for example, by proceeding back to a safe distance from adjacent PWCs.

If, in step 109, no other PWC in the vicinity is detected as getting closer, the flow returns to steps 135, 108 to keep performing the check for nearby approaching PWCs. In other embodiments, a set limit distance could be applied wherein if another PWC comes within a fixed distance from the PWC 45, step 110 is performed. In other embodiments, means can be provided to disable the performance of Process 2 if desired.

After setting the speed of the PWC 45 to "restricted" in step 110, performance of the test 109 is repeated. If there is any PWC still getting closer to the PWC 45, the flow again proceeds to determination of speed in steps 111, 113, 130, 133 and related safe distance tests in steps 112, 124, 131, 134. If the distance of other PWCs is further than the minimum safe distance at that speed, then the controller 23 will set speed to "unrestricted" in step 135 and continue back to step 108. If the distance to any other PWC is less than the safe distance at that speed, then the controller 23 will set speed to "restricted" in step 110 and continue back to step 108.

In Process 3 shown in FIG. 7, the controller 23 performs a test 115 to determine whether the card reader 19 has detected that a timer card 28 has been inserted by a driver. If so, in step 116, a timer is set to match the time recorded on the timer card, the green timer LED 49 is turned on and the speed limit of the PWC 45 is set to "unrestricted." If no timer card is detected in test 115, a test 117 is performed to detect whether a "set zone" card 26 has been detected by the card reader 19, which indicates that the PWC 45 is going to be driven so as to establish the perimeter or boundary 35 outside of which travel of the PWC 45 is not permitted. If a "set zone" card 26 has been detected, the flow proceeds to step 118 wherein the green, orange and red LEDs are flashed sequentially in one second intervals and the GPS position of the PWC 45 is sampled in one second intervals and stored in a perimeter coordinate table in memory 31 to establish the set zone area.

After performance of step 118, a test 120 is performed to see if the card reader 19 is still detecting the set zone card. If not, the flow returns to step 118. If so, the controller 23 proceeds to step 122 to calculate a new zone area for the PWC 45 based on the sampled perimeter coordinate data. In one embodiment, such calculation may apply filtering to remove data points which appear anomalous in order to smooth out the boundary of the set zone area. After performance of step 122, a test 127 is performed to determine if the set zone area has been successfully determined. If so, step 128 is executed where the green LED is lit up for two seconds, and the flow proceeds back to test 115. If not, step 129 is executed where the red LED 53 is flashed three time, and the flow proceeds back to test 115.

If, in test 117, a "set zone" card is not detected, the flow proceeds to test 119 where it is determined whether the timer is greater than zero or not. If it is not, step 121 is performed wherein the controller 23 sets the speed to restricted and turns off the green timer LED 49. If the timer is greater than zero, a test 123 is performed to determine if the current location of the PWC is within the calculated boundary zone area.

If at test 123 it is determined that the current location of PWC 45 is not within the set zone area 35, i.e. has traveled into the forbidden zone, the controller 23 immediately sets the speed to restricted in step 132 and lights up the outside zone LED 51. The driver will then direct the PWC 45 back towards the boundary, for example, by directing it back towards home base. Meanwhile, the process flow proceeds back through tests 115, 117 and 119, and if all are satisfied, again reaches test 123. If, at test 123, it is determined that the PWC 45 has traveled back within the set zone area, test 125 is performed wherein the current location of the PWC 45 is examined over a two second interval to determine whether it has been within the set zone over that interval. According to one example of performance of this examination, the controller 23 will sample and check the PWC location at 200 mili-second intervals for a period of two seconds, such that 10 consecutive positions must be within the set zone area for the flow to proceed to step 126 where the PWC speed is set back to unrestricted and the outside zone LED 51 is turned off.

The two second interval test procedure of test 125 avoids a phenomenon which can occur wherein employing only a single test to confirm that the PWC 45 is back in bounds can cause the PWC 45 to experience an unpleasant up-down-up-down jerking change of speed as the operator attempts to drive the watercraft back inside the perimeter 35, while not knowing where that perimeter 35 actually is Detecting whether the PWC 45 is within or outside the boundary or set zone area 35 may be accomplished, for example, by processing the received GPS position data using a well-known Crossing Number Algorithm, for example, as described in the article "Inclusion of a Point in a Polygon" by Dan Sunday available at http://geomalalgo-rithms.com/a03-_inclusion.html, which article is incorporated by reference herein in its entirety and included with the Information Disclosure Statement filed herewith. A Winding Number algorithm as described in the article might also be employed alternatively.

From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. A method of providing driving zone control for a personal watercraft comprising:
configuring apparatus installable on the personal watercraft to detect the position of the personal watercraft during operation thereof by monitoring GPS position data and further to limit the speed of the watercraft to a selected lower speed limit upon detecting that the watercraft has traveled beyond a selected boundary perimeter defined by GPS position data; and further configuring the apparatus to maintain the limitation on the speed of the watercraft as a driver of the watercraft attempts to drive the watercraft back within the selected boundary perimeter until a plurality of position tests performed during a selected time interval confirm that the watercraft has traveled to a position back within the boundary perimeter.

2. The method of claim 1 further comprising configuring the apparatus installable on the personal watercraft to establish the boundary perimeter by storing GPS position data as the personal watercraft is driven through a selected path prior to detecting that the watercraft has traveled beyond that boundary perimeter.

3. The method of claim 1 wherein the selected time interval is two seconds.

4. The method of claim 3 wherein each of the plurality of position tests is performed 200 milliseconds (ms) after an immediately preceding test.

5. Apparatus installable on a first watercraft for implementing driving zone control of the first watercraft comprising:
a throttle override apparatus comprising male and female electrical connectors which are respectively configured to electrically connect with respective existing female and male throttle control connectors of the first watercraft to thereby interpose a control function on the speed of the watercraft;
a GPS receiver configured to receive GPS positional coordinate information;
a non-transitory computer readable medium or media for storing GPS positional coordinate information and software instructions; and
a programmable processor for executing said instructions, the instructions when executed being operative to:
detect the position of the first watercraft and limit the speed of the first watercraft to a selected lower speed limit upon detecting that the first watercraft has traveled beyond a boundary perimeter defined by GPS position data;
maintain the limit on the speed of the first watercraft as a driver of the watercraft attempts to drive the watercraft back within the selected boundary perimeter until a plurality of position tests performed during a selected time interval confirm that the first watercraft has traveled to a position back within the boundary perimeter;
the apparatus further including a display comprising a panel containing a plurality of lighting devices, the lighting devices including a timer lighting device of a first color, an out of zone lighting device of a second color, a warning light of a third color, and a GPS light of a selected color;
the programmable processor further being operative to activate the timer light when operation of the first watercraft begins and to cause it to flash continuously during a selected time interval before operation of the first watercraft is to conclude, to activate the selected color light to indicate that the GPS receiver is operational to provide GPS positional coordinate information to the programmed processor, and to light up the out of zone light to indicate that the watercraft has traveled outside the boundary perimeter.

6. The apparatus of claim 5 wherein the selected time interval is two seconds.

7. The apparatus of claim 6 wherein each of the plurality of position tests is performed 200 milliseconds after an immediately preceding test.

8. The apparatus of claim 5 wherein the instructions are further operative to establish said boundary perimeter by storing GPS positional coordinate information in said computer readable medium or media as the watercraft is driven through a selected path during operation of the first watercraft.

9. The apparatus of claim 8 further comprising an RF transceiver, said programmable processor being supplied with data from said RF transceiver and configured to process that data to detect that a second watercraft is located within a selected distance of said first watercraft.

10. The apparatus of claim 8 wherein each of the lighting devices is an LED.

11. A non-transitory computer readable medium or computer readable media installable on a personal watercraft and having computer readable program code embodied therein, said computer readable program code being adapted to be executed by at least one or more computers to implement a method comprising:
detecting the position of the watercraft by monitoring GPS position data and limiting the speed of the watercraft to a selected lower speed limit upon detecting that the watercraft has traveled beyond a boundary perimeter defined by GPS position data;
maintaining the limitation on the speed of the watercraft as a driver of the personal watercraft attempts to drive the watercraft back within the selected boundary perimeter until a plurality of position tests performed during a selected time interval confirm that the watercraft has traveled to a position back within the boundary perimeter.

12. The non-transitory computer readable medium or computer readable media of claim 11 wherein the method further comprises establishing said boundary perimeter by storing GPS position data in said computer readable medium or computer readable media as the personal watercraft is driven through a selected path during operation of the watercraft.

13. The computer readable medium or computer readable media of claim 11 wherein the selected time interval is two seconds.

14. The computer readable medium or computer readable media of claim 13 wherein each of the plurality of position tests is performed 200 milliseconds after an immediately preceding test.

15. Apparatus installable on a watercraft for implementing driving zone control of the watercraft comprising:
a GPS receiver configured to receive GPS positional coordinate information;
a non-transitory computer readable medium or media located on the watercraft for storing GPS positional coordinate information and software instructions; and
a programmable processor operable to execute said instructions, the instructions when executed being operative to:
detect the position of the watercraft and limit the speed of the watercraft to a selected lower speed limit upon detecting that the watercraft has traveled beyond a boundary perimeter defined by GPS position data; and
maintain the limit on the speed of the watercraft as a driver of the watercraft attempts to drive the watercraft back within the selected boundary perimeter until a plurality of position tests performed during a selected time interval confirm that the watercraft has traveled to a position back within the boundary perimeter.

16. The apparatus of claim 15 further comprising a throttle override apparatus comprising male and female electrical connectors which are respectively configured to electrically connect with respective existing female and male throttle control connectors of the watercraft to thereby interpose a control function on the speed of the watercraft and wherein the programmable processor is further operable to execute said instructions so as to cause said throttle control apparatus to limit the speed of the watercraft.

17. The apparatus of claim 15 wherein the selected time interval is two seconds.

18. The apparatus of claim 17 wherein each of the plurality of position tests is performed 200 milliseconds after an immediately preceding test.

* * * * *